(12) United States Patent
Prasantanakorn et al.

(10) Patent No.: US 12,431,790 B2
(45) Date of Patent: Sep. 30, 2025

(54) PFC DESIGN TECHNIQUE FOR HIGH PEAK LOAD

(71) Applicant: Apple Inc., Cupertino, CA (US)

(72) Inventors: Chanwit Prasantanakorn, Santa Clara, CA (US); Bharat K Patel, San Martin, CA (US)

(73) Assignee: Apple Inc., Cupertino, CA (US)

(*) Notice: Subject to any disclaimer, the term of this patent is extended or adjusted under 35 U.S.C. 154(b) by 261 days.

(21) Appl. No.: 18/175,848

(22) Filed: Feb. 28, 2023

(65) Prior Publication Data

US 2024/0136919 A1    Apr. 25, 2024

Related U.S. Application Data

(60) Provisional application No. 63/380,096, filed on Oct. 19, 2022.

(51) Int. Cl.
 *H02M 1/42* (2007.01)
(52) U.S. Cl.
 CPC ................. *H02M 1/4225* (2013.01)
(58) Field of Classification Search
 CPC ............... H02M 1/4225; Y02B 70/10
 See application file for complete search history.

(56) References Cited

U.S. PATENT DOCUMENTS

| | | | | |
|---|---|---|---|---|
| 7,719,248 B1* | 5/2010 | Melanson | ........... | H02M 1/4225 323/283 |
| 2018/0219474 A1* | 8/2018 | Greetham | ................. | H02J 7/02 |

* cited by examiner

*Primary Examiner* — Adolf D Berhane
*Assistant Examiner* — Afework S Demisse
(74) *Attorney, Agent, or Firm* — FLETCHER YODER PC

(57) ABSTRACT

A power factor correction circuit can include an input that receives a rectified AC input voltage; at least one switching device operable to control an input current of the power factor correction circuit to be in phase with the rectified AC input voltage; and control circuitry that controls the at least one switching device to produce a clipped sinusoidal input current, thereby increasing peak load capacity of the power factor correction circuit. The control circuitry can operate the at least one switching device in a critical conduction mode. The power factor correction circuit can further include an inductor having an inductor current therethrough controlled by the at least one switching device and the control circuitry. The inductor can be sized for a peak current corresponding to a peak of the clipped sinusoidal input current.

17 Claims, 5 Drawing Sheets

PFC DESIGN TECHNIQUE FOR HIGH PEAK LOAD

CROSS-REFERENCE TO RELATED APPLICATIONS

This application claims priority to U.S. Provisional Application No. 63/380,096, filed Oct. 19, 2022, entitled "PFC DESIGN TECHNIQUE FOR HIGH PEAK LOAD," the disclosure of which is incorporated by reference herein in its entirety for all purposes.

BACKGROUND

AC-DC power supplies for various electronic devices may include power factor correction (PFC) circuitry to control an AC input current to be in phase with an AC input voltage. Such PFC circuits may include inductors and switching devices that control the current therethrough, such as boost converters. Traditionally, the inductors have been sized (i.e., designed or selected) to carry the peak current associated with the peak load without magnetically saturating the inductor. This can lead to inductors that have increased conduction losses under all operating conditions and/or inductors that are physically larger than may desired for certain applications.

SUMMARY

Thus it would be desirable to provide power factor correction circuits and AC-DC power supplies using such circuits that can accommodate transient peak loads without designs or configurations that lead to increased conduction losses.

A power factor correction circuit can include an input that receives a rectified AC input voltage; at least one switching device operable to control an input current of the power factor correction circuit to be in phase with the rectified AC input voltage; and control circuitry that controls the at least one switching device to produce a clipped sinusoidal input current, thereby increasing peak load capacity of the power factor correction circuit. The control circuitry can operate the at least one switching device in a critical conduction mode. The power factor correction circuit can further include an inductor having an inductor current therethrough controlled by the at least one switching device and the control circuitry. The inductor can be sized for a peak current corresponding to a peak of the clipped sinusoidal input current.

The control circuitry can include control circuitry that generates a gate signal for the at least one switching device; an inductor current sensor; comparator circuitry that compares the sensed inductor current to a threshold voltage; and logic that selectively triggers the at least one switching device responsive to the gate signal and the comparator circuitry. The inductor current sensor can include a current sense resistor in series with the at least one switching device. The inductor current sensor can include a current sense resistor in an input return path of the power factor correction circuit. The threshold voltage can be adjustable. The power factor correction circuit can be a boost converter.

An AC-DC power supply can include a rectifier that receives an AC input voltage and produces a rectified AC input voltage; a power factor correction stage that receives the rectified AC input voltage and produces an intermediate DC output voltage; and a DC-DC converter stage that receives the intermediate DC output voltage and produces a regulated output voltage for a load. The power factor correction stage can further include an input that receives a rectified AC input voltage; at least one switching device operable to control an input current of the power factor correction stage to be in phase with the rectified AC input voltage; and control circuitry that controls the at least one switching device to produce a clipped sinusoidal input current, thereby increasing peak load capacity of the power factor correction circuit. The control circuitry can operate the at least one switching device in a critical conduction mode.

The AC-DC power can further include an inductor having an inductor current therethrough controlled by the at least one switching device and the control circuitry, wherein the inductor is sized for a peak current corresponding to a peak of the clipped sinusoidal input current. The control circuitry can include control circuitry that generates a gate signal for the at least one switching device; an inductor current sensor; comparator circuitry that compares the sensed inductor current to a threshold voltage; and logic that selectively triggers the at least one switching device responsive to the gate signal and the comparator circuitry. The inductor current sensor can include a current sense resistor in series with the at least one switching device. The inductor current sensor can include a current sense resistor in an input return path of the power factor correction stage. The threshold voltage can be adjustable. The power factor correction stage can be a boost converter.

A power factor correction circuit can include an input that receives a rectified AC input voltage; an inductor having an inductor current therethrough; at least one switching device operable to control the inductor current to be in phase with the rectified AC input voltage; and control circuitry that controls the at least one switching device to produce a clipped sinusoidal inductor current, thereby increasing peak load capacity of the power factor correction circuit, wherein the inductor is sized for a peak current corresponding to a peak of the clipped sinusoidal input current. The control circuitry can include critical conduction mode peak current control circuitry that generates a gate signal for the at least one switching device; an inductor current sensor; comparator circuitry that compares the sensed inductor current to a threshold voltage; and logic that selectively triggers the at least one switching device responsive to the gate signal and the comparator circuitry. The threshold voltage can be adjustable. The power factor correction circuit can be a boost converter.

DETAILED DESCRIPTION

Figure 1:
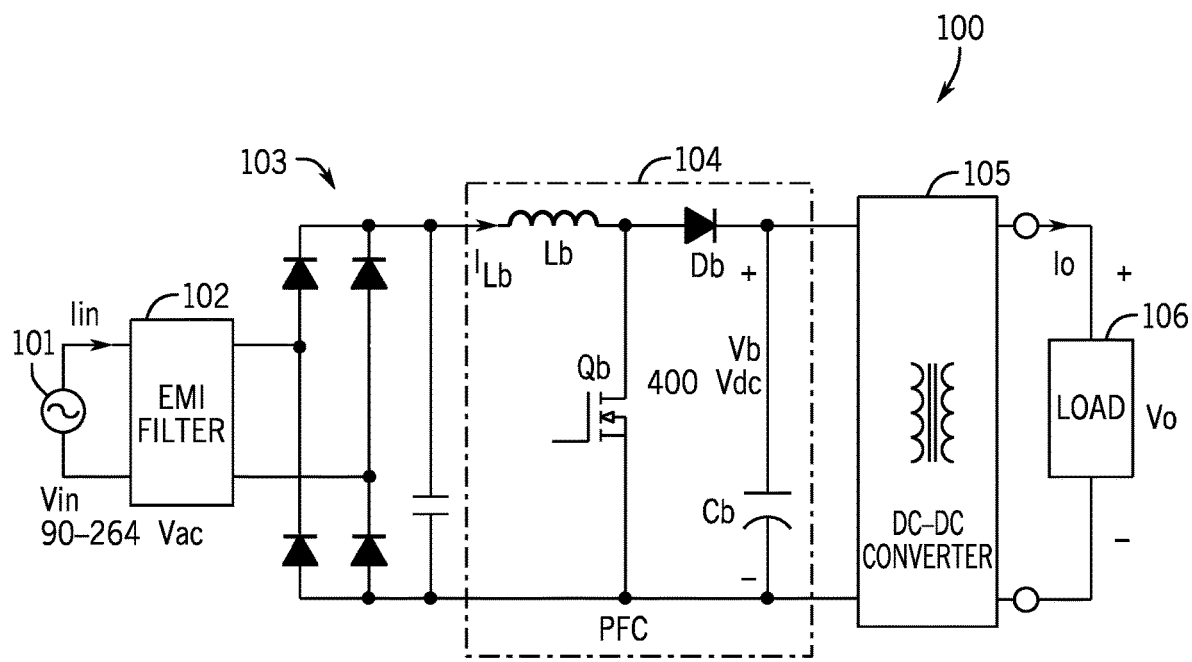
FIG. 1 illustrates a power supply circuit including a PFC stage and a DC-DC converter stage.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a power supply circuit 100 including a PFC stage 104 and a DC-DC converter stage 105. Power supply circuit 100 may be used in a variety of applications. One example application could be a power supply for a personal computer, such as a desktop computer, although numerous other applications are also possible. Power supply 100 can receive an AC input voltage Vin from an AC voltage source 101. Voltage source 101, could be a mains power connection, for example. Power supply 100 can be designed to operate over a wide range of operating voltages, for example 90-264 Vac. This can allow the power supply to be used in different regions of the world where the AC mains voltage varies, e.g., 120 Vac in the U.S. versus 240 Vac in Europe. Power supply 100 may draw an input current Iin from AC voltage source 101. This current will be a function of the load 106. In any case, an electromagnetic interference (EMI) filter 102 may be provided to reduce the effect of electromagnetic interference associated with power supply 100 (e.g., switching operations) from adversely affecting AC source 101 and vice versa.

The received and EMI filtered AC power may be rectified by a rectifier 103 to a DC voltage. Rectifier 103 can include a full bridge diode configuration (as illustrated) or could include other rectifier configurations such as half bridges, active rectifiers (using active switches in place of the diodes, etc.). This rectified DC voltage may then be applied to a power factor correction (PFC) stage 104. PFC stage 104 can be used to shape the input current Iin so that it is in phase with the input voltage Vin as described in greater detail below. The illustrated PFC stage 104 is effectively a boost converter, although other circuit designs could also be used. The output voltage Vb of PFC stage 104 can be greater than the input voltage, e.g., 400 Vdc, although other output voltage values could also be provided.

In any case, the output voltage of PFC circuit 104 can be provided to the input of a DC-DC conversion stage 105, illustrated in block diagram form in FIG. 1. DC-DC conversion stage 105 can be configured to produce the desired output voltage Vo (and output current Io) that are provided to the load 106. DC-DC conversion stage 105 can take on a variety of forms or circuit topologies and can be controlled by control circuitry that regulates one or more output parameters (e.g., the output voltage Vo and/or output current Io). In some embodiments, DC-DC conversion stage 105 can be an isolated converter, meaning that a transformer or other structure can provide galvanic isolation between the output of power supply 100 and the input of power supply 100. In other embodiments, DC-DC converter may be a non-isolated power supply. Suitable configurations of DC-DC conversion stage 105 can include LLC converters (including resonant LLC converters), flyback converters, etc.

Various regulatory standards may require that certain AC-DC power supplies have total harmonic distortion (THD) values below specified thresholds and power factor (PF) values above specified thresholds. As briefly mentioned above, PFC stage 104 can control the input current Iin to be close to a sinusoidal waveform to achieve desired THD and PF targets. In at least some embodiments, PFC stage 104 can be implemented as a boost converter that includes a boost inductor Lb, a boost switch Qb, and a boost diode Db. Construction of boost inductor Lb is described in greater detail below. Boost switch Qb may be a semiconductor switching device such as a transistor (e.g., a MOSFET—metal oxide semiconductor field effect transistor) and may be implemented using any suitable semiconductor technology, such as silicon (Si), silicon carbide (SiC), gallium nitride (GaN), etc. A bulk capacitor Cb may also be provided for output voltage stabilization. Control circuitry (not shown) can regulate the output voltage by switching boost switch Qb on and off responsive to a suitable feedback signal. The control circuitry can be implemented in a variety of forms, including any suitable combination of analog, digital, and/or programmable circuitry constructed using discrete components, integrated circuits, or a combination thereof. Suitable control circuitry for at least some applications may be commercially available from a variety of vendors.

Figure 2:
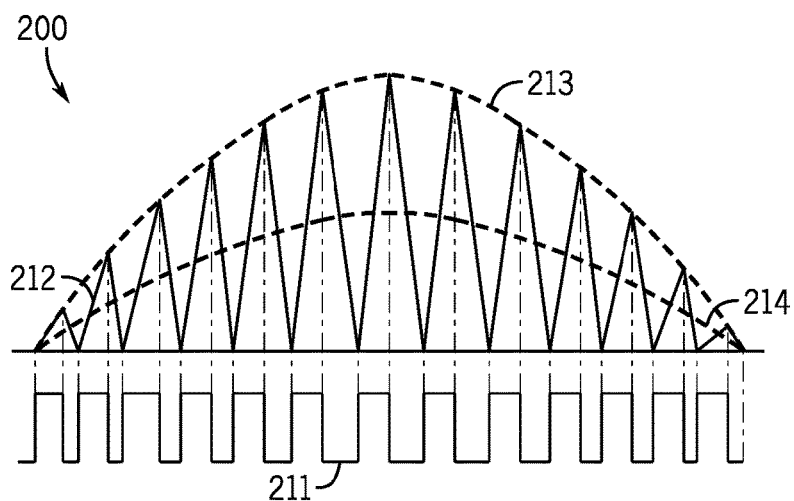
FIG. 2 illustrates inductor current for critical conduction mode control of a PFC stage.

FIG. 2 illustrates a plot 200 of inductor current for critical conduction mode control of a PFC stage. Critical conduction mode PFC control is often implemented in PFC circuits for power supplies with power ratings below about 600 W, although it may be used in applications having other power ratings. Waveform 211 in FIG. 2 depicts the gating signal that drives PFC boost switch Qb, which may be generated by the control circuitry as described above. When the gating signal is high, switch Qb is turned on, and the instantaneous inductor current (depicted by triangular waveform 212) rises linearly. When switch Qb is turned off, the instantaneous inductor current 212 decreases linearly. Critical conduction mode means that the boost switch Qb is controlled so that the switch is turned on again when the instantaneous inductor current reaches zero, as opposed to a continuous conduction mode (in which the inductor current would always be greater than zero) or a discontinuous conduction mode (in which the inductor current would spend certain periods at zero). The instantaneous inductor current 212 follows a sinusoidal peak current envelope 213 that corresponds in shape and phase to the AC input voltage Vin. The resultant average inductor current 214 is also sinusoidal and has a value equal to ½ the peak inductor current.

The input current of the PFC stage at the minimum input voltage can be calculated by:

$$I_{in} = \frac{\sqrt{2} \cdot Po_{PFC}}{\eta_{PFC} \cdot Vin_{min}}$$

where $Po_{PFC}$ is the power rating of the power factor correction stage, $\eta_{PFC}$ is the efficiency of the power factor correction stage, and $Vin_{min}$ is the minimum input voltage. As noted above, the peak inductor current is twice the average input current, and can thus be calculated by:

$$I_{Lpk} = \frac{2\sqrt{2} \cdot Po_{PFC}}{\eta_{PFC} \cdot Vin_{min}}$$

Figure 3:
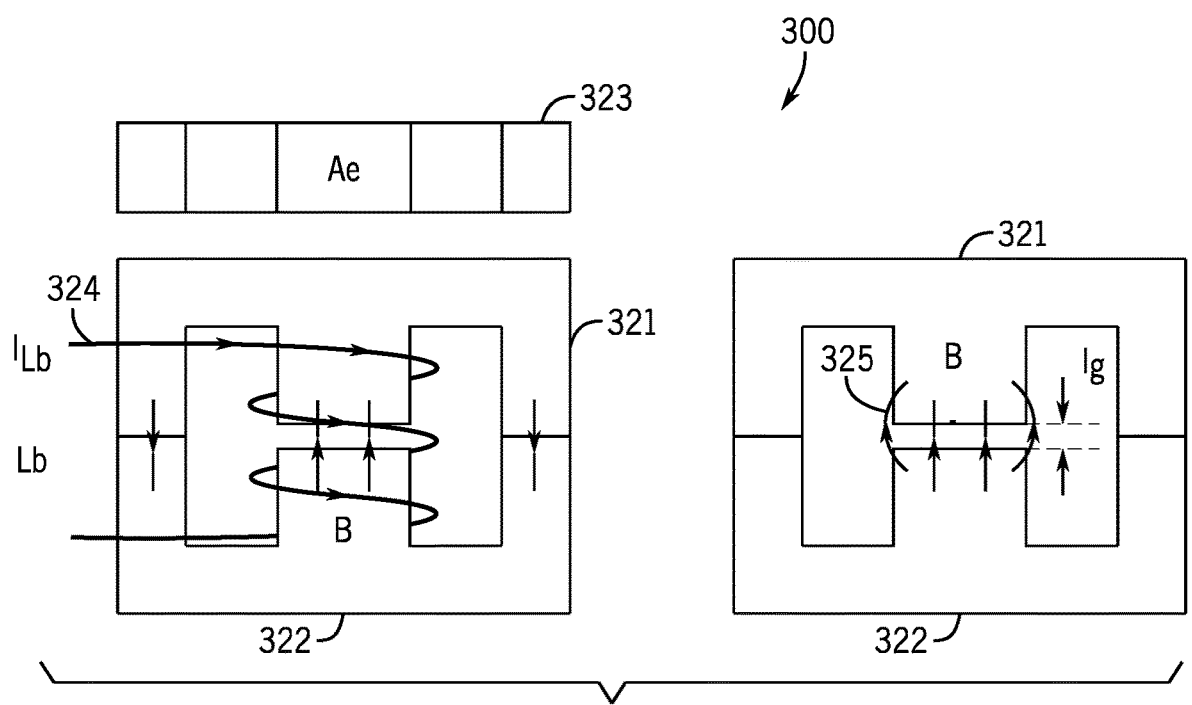
FIG. 3 illustrates inductor construction for a PFC stage.

FIG. 3 illustrates inductor construction 300 for a PFC stage, e.g., for boost inductor Lb. The illustrated inductor configuration is merely exemplary, and variations in size, shape, etc. could be employed without departing from the basic principles described herein. An inductor can include a magnetic core 321/322 and a winding 324. The magnetic core can be formed of a ferromagnetic material, such as a ferrite material, etc., and can (but need not) include multiple core pieces, e.g., E-shaped core segments 321/322. The winding 324 may be made of wire, such as copper wire, wound around at last a portion of the magnetic core. In some embodiments, the winding could include traces on a printed circuit board disposed about the core. A current kb flowing in the winding 324 (in the direction corresponding to the arrows) will generate a corresponding magnetic flux B in the core (also in the direction corresponding to the arrows. The inductor may (but need not) include an air gap of length lg separating the core segments, e.g., on the center leg. Near the edges of the air gap the magnetic flux may diverge from the projected area of the core, a phenomenon known as "fringing flux" 325.

An inductor for a PFC stage application can be characterized in a variety of ways, and thus the design and selection can be guided by such characterizations. For example, the number of turns N in the inductor winding can be given by the equation:

$$N = \frac{L_b \cdot I_{Lpk}}{B_{max} \cdot Ae}$$

where Lb is the inductance, $I_{Lpk}$ is the peak current, Bmax is the maximum flux density without saturating the core (a property of the core material), and Ae is the effective cross-sectional area of the magnetic core. Similarly, air gap length lg can be given by the equation:

$$l_g = \frac{N^2 \mu_0 Ae}{L_b}$$

where N is the number of turns in the winding, µ0 is the magnetic permeability of the material, Ae is the effective cross-sectional area of the core, and Lb is the inductance. As suggested by these equations, increased power handling requirements lead to higher peak currents. All else being equal, higher peak currents can lead to an increased number of turns. This increased number of turns can increase the DC resistance of the winding, leading to higher conduction losses. Additionally, more turns can lead to a longer air gap length, which increases the fringing flux and in turns leads to even higher conduction losses. Thus, increased power requirements can lead to a cascading adverse effect on the inductor design.

For a given inductor current, the inductor core size and the number of turns can be selected to ensure a magnetic flux density that stays below the magnetic saturation flux density of the core material. The required number of turns of the inductor can thus be proportional to the maximum peak inductor current.

$$N_{Lb} = \frac{L_b \cdot I_{Lpk}}{B_{max} \cdot Ae}$$

The higher peak power from the PFC stage can lead to a larger core sectional area (Ae) or a higher number of turns (NLb) for a given inductance Lb. Thus, a PFC stage with higher peak power needs a larger core size. Otherwise, it can suffer from a higher conduction loss.

Power requirements of a power supply and correspondingly of a PFC stage of a power supply can be thought of as falling into three categories. A first category, steady state load, can correspond to the load that the power supply is rated to support for indefinite periods of time. This can be thought of as the 100% rating of the power supply or PFC conversion stage and can correspond to the normal load of the powered device. Modern computer systems or consumer electronics products often demand more power than this rated power for a short duration. This can be thought of as peak load. As one example, peak load can be 125-150% of the rated power lasting from 10 to 100 msec. Prior art conventional approaches to PFC design stages for power supplies have sized the PFC stage and associated components (e.g., inductor Lb) to meet this power requirement, leading to the issues described above with respect to inductor conduction losses, and/or requiring the construction of larger, heavier, or more expensive inductor structures to achieve desired efficiency targets. A third category, surge load, can correspond to loads greater than 150% of the rated power, which have very short durations (e.g., durations on the order of 2 ms or less), less than one half line cycle of the supplied AC power, which is 10 ms for 50 Hz electrical systems or 8.67 ms for 60 Hz electrical systems. Such loads generally do not affect PFC stage design.

Figures 4A, 4B:
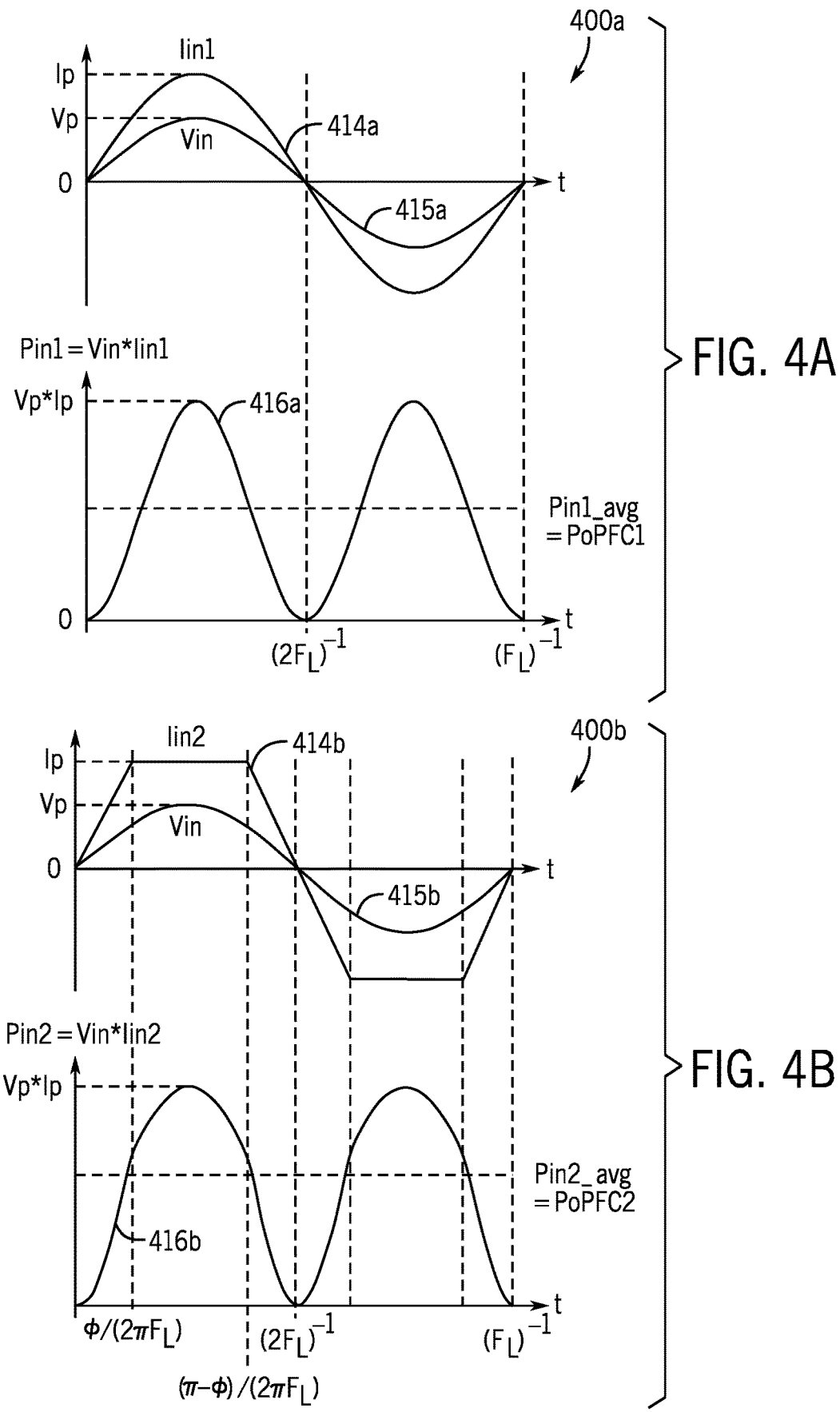
FIGS. 4A-4B illustrate voltage, current, and power for a PFC stage.

FIG. 4A illustrates plots 400a corresponding to illustrating input current In1 (sinusoidal waveform 414a), input voltage yin (sinusoidal waveform 415a), and instantaneous power Pin1 (sinusoidal waveform 416a). Input current Iin1 has a peak value Ip and is in phase with the input voltage Vin, which has a peak value Vp. The instantaneous power Pin1 is sinusoidal with twice the frequency of the input voltage and current and has a peak value equal to Vin*In1 and an average value Pin1_avg (also PoPFC1) that is one-half the peak value.

FIG. 4B illustrates plots 400b corresponding to an alternative approach in which the input current is a clipped sinusoid rather than a pure sinusoid as described above with respect to FIG. 4A. The plots 400b illustrate input current In2 (clipped sinusoidal waveform 414b), input voltage yin (sinusoidal waveform 415b), and instantaneous power Pin2 (quasi-sinusoidal waveform 416b). Input current Iin1 has a clipped peak value Ip and is in phase with the input voltage Vin, which has a peak value Vp. However, the input current Iin2 rises more quickly to its peak value and stays at this clipped peak value over a portion of the cycle. As a result, the instantaneous power Pin2 is quasi-sinusoidal with twice the frequency of the input voltage and current and has a peak value equal to Vin*In2. However, the average value Pin2_avg (also PoPFC2) is higher than the average power value in FIG. 4A because of the higher overall average current. The portion of the line cycle over which the input current is clipped to its maximum value can be characterized by the angle ϕ, with the current reaching its maximum value and being clipped at a time $\phi/2\pi F_L$ (where $F_L$ is the line frequency) and remaining at this value until time $(\pi-\phi)/(2\pi F_L)$. The phase angle ϕ thus defines the fraction of the half line cycle over which the input current is clipped to its maximum value.

By clipping the input current over a portion of the line cycle, the average power handling capability of the PFC stage can be increased as described above, without increasing the peak current rating of components such as the inductor. Thus, the deleterious effects on conduction losses of the inductor with increases in inductor peak current capacity can be avoided. Additionally, although the input current clipping introduces non-linearities that increase the total harmonic distortion (THD), this occurs only during relatively short transient periods. Regulatory and other requirements relating to THD are typically over substantially longer time periods than the relatively short peak load periods described above (e.g., on the order of a few to several line cycles).

The below table lists various circuit parameters that are described in the following equations characterizing PFC stage design according to the principles introduced above.

| Parameter | Description |
|---|---|
| Po$_{PFC}$ | Output power of PFC power stage |
| Vin$_{min}$ | Minimum input voltage |
| η$_{PFC}$ | Efficiency of PFC power stage |
| I$_{Lpk}$ | Peak current of PFC inductor |
| I$_{in}$ | Input current of PFC stage |
| V$_{ocp\_th}$ | OCP threshold of PFC control circuit |
| R$_{CS}$ | PFC current sense resistor |
| L$_b$ | PFC inductor |
| B$_{max}$ | Maximum flux density of PFC inductor core |
| Ae | Effective core area of the PFC inductor core |
| N$_{Lb}$ | Number of turns on PFC inductor |

The efficiency of the PFC power stage can be assumed to be 100% to simplify the analysis and derivation. Therefore, the input power, Pin, equals the PFC output power, PoPFC. The table below

| Parameter | Description |
|---|---|
| Vp | Input voltage amplitude |
| Ip | Input current amplitude |
| F$_L$ | Frequency of the input voltage |
| T$_L$ | Period of the input voltage period = FL-1 |
| ϕ | Phase angle that the clipped input current starts |

Using a sinusoidal input current as depicted in FIG. 4A, the period of the input voltage/current is given by:

$$T_L = F_L^{-1}$$

Thus, the instantaneous input voltage as a function of time is given by:

$$v_{in}(t) = Vp \cdot \sin(2\pi F_L t)$$

and the instantaneous input current as a function of time is given by:

$$i_{in1}(t) = Ip \cdot \sin(2\pi F_L t)$$

Instantaneous power of the PFC stage is thus given by:

$$P_{in1}(t) = v_{in}(t) \cdot i_{in1}(t)$$

and average power is given by:

$$P_{in1\_avg} = \frac{2}{T_L} \int_0^{T_L/2} v_{in}(t) \cdot i_{in1}(t) dt$$

which can be shown to be:

$$P_{in1\_avg} = \frac{1}{2} \cdot Vp \cdot Ip$$

Conversely, using a clipped sinusoidal input current as depicted in FIG. 4B, the input current can be at the phase angle ϕ to increase average output power with respect to the sinusoidal input current case. The clipped current is given by:

$$i_{in2}(t) = \begin{cases} \frac{Ip}{\sin(\phi)} \cdot \sin(2\pi F_L t), & 0 \le t < \frac{\phi}{2\pi F_L} \\ Ip, & \frac{\phi}{2\pi F_L} \le t < \left(\frac{1}{2F_L} - \frac{\phi}{2\pi F_L}\right) \\ \frac{Ip}{\sin(\phi)} \cdot \sin(2\pi F_L t), & \left(\frac{1}{2F_L} - \frac{\phi}{2\pi F_L}\right) \le t < \frac{1}{2F_L} \end{cases}$$

Instantaneous power is thus given by:

$$P_{in2}(t) = v_{in}(t) \cdot i_{in2}(t)$$

with average power given by:

$$P_{in2\_avg} = \frac{2}{T_L} \int_0^{T_L/2} v_{in}(t) \cdot i_{in2}(t) dt$$

which can be shown to be equal to:

$$P_{in2\_avg} = \frac{1}{2} \cdot Vp \cdot Ip \cdot \left(\frac{4\cos(\phi)}{\pi} - \frac{\sin(2\phi) - 2\phi}{\pi \sin(\phi)}\right)$$

When ϕ=π/2 or 90°, the input current becomes the sinusoidal waveform, and the PFC output power matches between the two cases. In other words:

$$P_{in2\_avg}|_{\phi=0} =$$

$$\frac{1}{2} \cdot Vp \cdot Ip \cdot \left(\frac{4\cos\left(\frac{\pi}{2}\right)}{\pi} - \frac{\sin\left(2 \cdot \frac{\pi}{2}\right) - 2 \cdot \frac{\pi}{2}}{\pi \sin\left(\frac{\pi}{2}\right)}\right) = \frac{1}{2} \cdot Vp \cdot Ip = 0.500 \cdot Vp \cdot Ip$$

When ϕ=0 that the input current becomes a square wave, and the PFC output power exceeds the sinusoidal case by the greatest possible amount. In other words:

$$P_{in2\_avg}|_{\phi=0} =$$

$$\frac{1}{2} \cdot Vp \cdot Ip \cdot \left(\frac{4\cos(0)}{\pi} - \frac{\sin(2 \cdot 0) - 2 \cdot 0}{\pi \sin(0)}\right) = \frac{2}{\pi} \cdot Vp \cdot Ip = 0.637 \cdot Vp \cdot Ip$$

Thus, for the same peak input current, Ip, the output power gain from the input clipping operation as the function of φ can be expressed by:

$$G(\phi) = \frac{P_{in2\_avg}}{P_{in1\_avg}} = \frac{4\cos(\phi)}{\pi} - \frac{\sin(2\phi) - 2\phi}{\pi\sin(\phi)}$$

Figure 5A:
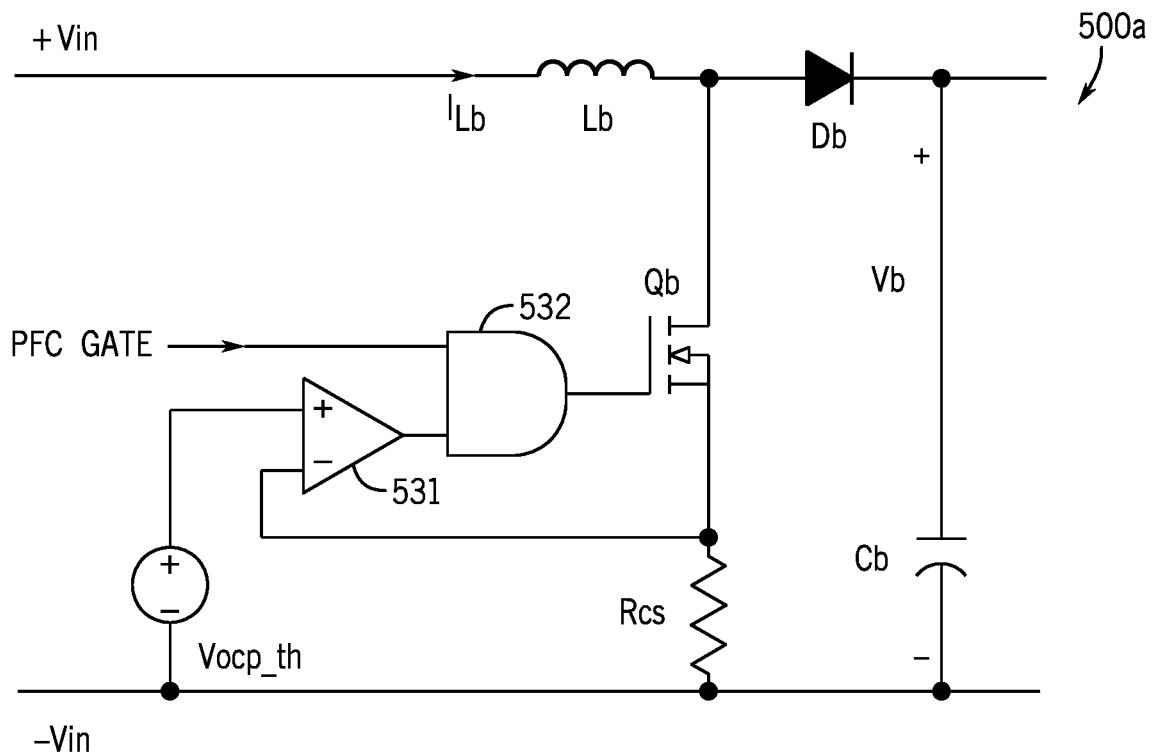
FIGS. 5A-5B illustrate modified control circuitry for a PFC stage.
Figure 5B:
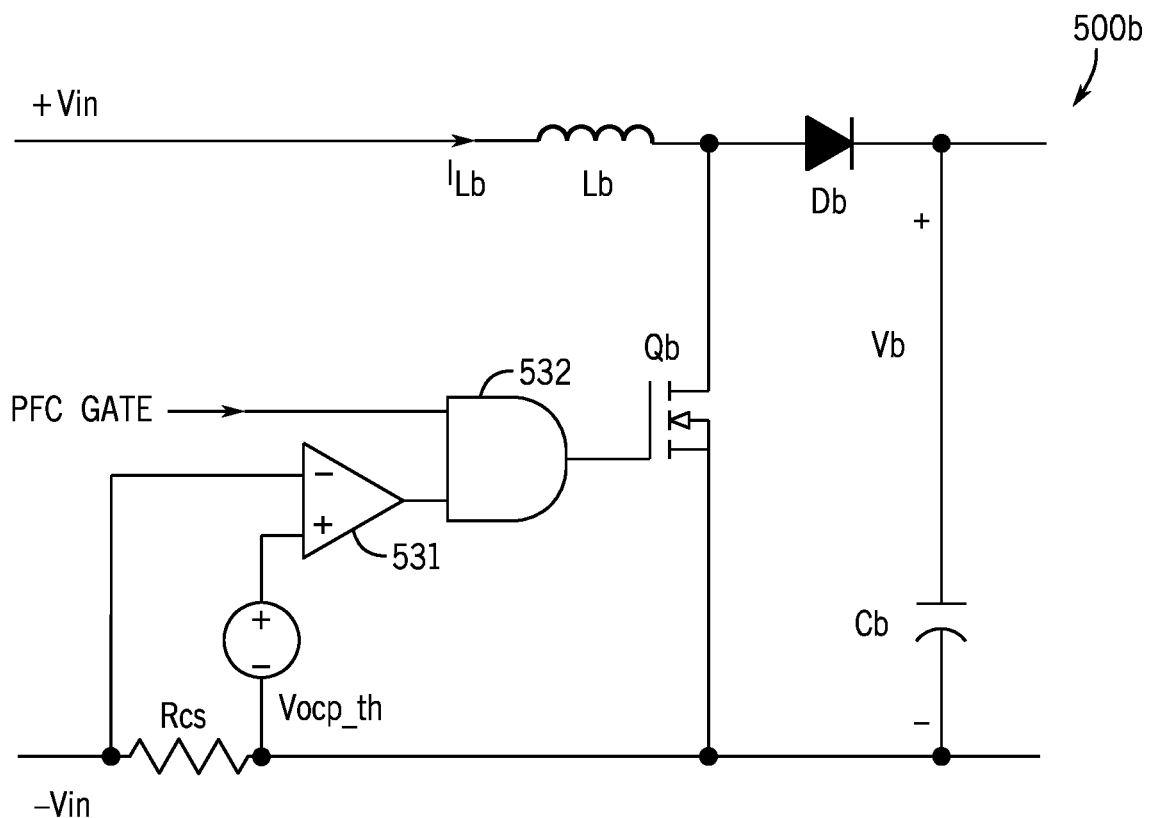
Figure 6:
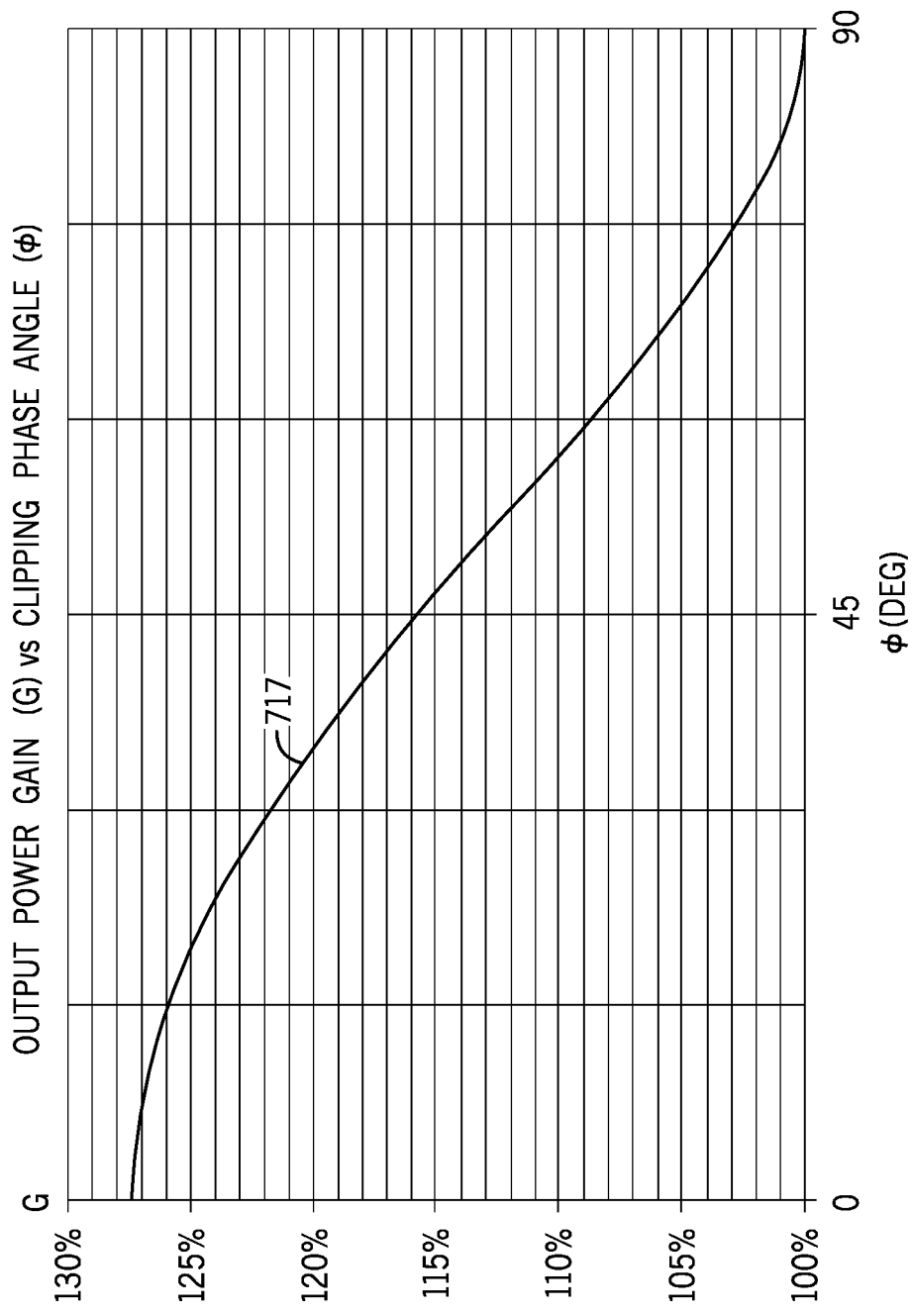
FIG. 6 illustrates a plot of output power gain vs. clipping angle for a PFC stage.

FIGS. 5A-5B illustrate modified control circuitry for a PFC stage. More specifically, FIGS. 5A and 5B illustrate a simplified schematic 500a of PFC stage 104 as depicted in FIG. 1. The rectified input voltage (+/−Vin) is received at the left-had side of the circuit and results in a current kb through boost inductor Lb. When main switch Qb is closed, this current flows downward, through sense resistor Rcs, returning via the bottom/negative rail. When main switch Qb is open, this current flows to the output via diode Db (which could be replaced with a synchronous rectifier switching device) where it charges output capacitor Cb and/or provides power to a load connected to the output (e.g., DC-DC conversion stage 105, as depicted in FIG. 1). Main switch Qb can be controlled by controller circuitry as described above including a portion (not shown) that generates a PFC gate signal, as was described above with respect to FIG. 2. As described, this gate signal may be generated by analog, digital, and/or programmable circuitry, whether discrete or integrated, using any suitable algorithms to produce the desired output voltage and/or current. The remaining control circuitry explicitly depicted in FIG. 5A can be used to perform the input current clipping operation described above.

More specifically, the PFC control circuit includes a current sense resistor, Rcs, to control the input current waveform and to perform the over current protection (OCP) function. This current sense resistor can be placed at the source of main switch Qb, as shown in FIG. 5A, or it can be placed in the return path as shown in FIG. 5B. In either case, the current sensor sets the peak current limit for peak current control of the boost converter. The boost inductor current flowing through the sense resistor Rcs will generate a voltage that can be cared to a threshold voltage Vocp_th (e.g., an overcurrent protection threshold voltage) by a comparator 531. In some embodiments, the threshold voltage can be a variable voltage controlled by the controller circuitry to change the point at which input current clipping engages. Comparator 531 will thus generate a positive output when the inductor current is below the peak threshold and a zero output when the inductor current reaches or exceeds the peak threshold. The comparator output can be provided to an input AND gate 532, which can receive at its other input the conventional PFC gate drive signal described above. If both inputs are high, then the gate of main switch Qb will be triggered, turning on the switch. If either input is low, then main switch Qb will be off. Comparator 531 and AND gate 532 are illustrated as discrete components, but these components could be implemented using integrated circuitry and/or by a programmable device implementing equivalent logic.

Thus, the current sense resistor, Rcs, sets the peak inductor current.

$$I_{Lpk} = \frac{V_{ocp\_th}}{R_{CS}}$$

After the peak inductor current is set, the PFC inductor can be designed or selected to support the peak current. Inductor design or selection can be based on the principles described above with respect to FIG. 3. The inductor core size and the number of turns can be selected to ensure a magnetic flux density that stays below the magnetic saturation flux density of the core material. The required number of turns of the inductor can thus be proportional to the maximum peak inductor current.

$$N_{Lb} = \frac{L_b \cdot I_{Lpk}}{B_{max} \cdot Ae}$$

The higher peak power from the PFC stage would normally a larger core sectional area (Ae) or a higher number of turns ($N_{Lb}$) for a given inductance Lb. The PFC stage with higher peak power needs a larger core size. Otherwise, it suffers from a higher conduction loss. However, without the constraint on sinusoidal input current, the PFC inductor does not have to be oversized to support the peak load power. When the input current during peak load is allowed to be a clipped sinusoidal, trapezoidal, or square waveform, the PFC stage can supply a higher average power using the same peak inductor current, $I_{Lpk}$. This design approach yields a more compact or lower loss PFC boost inductor.

FIG. 7 illustrates a plot of output power gain vs. clipping angle for a PFC stage. As described above, the output power gain from the input clipping operation as a function of φ can be expressed by:

$$G(\phi) = \frac{P_{in2\_avg}}{P_{in1\_avg}} = \frac{4\cos(\phi)}{\pi} - \frac{\sin(2\phi) - 2\phi}{\pi\sin(\phi)}$$

The benefit can be substantial when $$\phi < \frac{\pi}{4} \text{ or } \phi < 45°.$$

power gain occurs when φ=0, which corresponds to the square wave input current. With φ=0 or a square wave current, the maximum power gain from the same peak current amplitude (Ip) equals to 4/π or 127.3%. The output power can thus be increased by the factor of $$\left(\frac{4}{\pi}\right) - 1 = 27.3\%,$$

with conduction losses reduced by a factor of $$\left(\frac{4}{\pi}\right) - 1 = 62.1\%.$$

The foregoing describes exemplary embodiments of PFC circuits for increased peak load capability with improved efficiency. Such configurations may be used in a variety of applications but may be particularly advantageous when used in conjunction with computer power supplies, including but not limited to computers with relatively higher power consumption, such as desktop computers, workstations, servers, and the like. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power factor correction circuit comprising: an input that receives a rectified AC input voltage; at least one switching device operable to control an input current of the power factor correction circuit to be in phase with the rectified AC input voltage; and control circuitry that controls the at least one switching device to produce a clipped sinusoidal input current, thereby increasing peak load capacity of the power factor correction circuit; wherein the control circuitry comprises: control circuitry that generates a gate signal for the at least one switching device; an inductor current sensor; comparator circuitry that compares the sensed inductor current to a threshold voltage; and logic that selectively triggers the at least one switching device responsive to the gate signal and the comparator circuitry.

2. The power factor correction circuit of claim 1 wherein the control circuitry operates the at least one switching device in a critical conduction mode.

3. The power factor correction circuit of claim 1 further comprising an inductor having an inductor current therethrough controlled by the at least one switching device and the control circuitry, wherein the inductor is sized for a peak current corresponding to a peak of the clipped sinusoidal input current.

4. The power factor correction circuit of claim 1 wherein the inductor current sensor comprises a current sense resistor in series with the at least one switching device.

5. The power factor correction circuit of claim 1 wherein the inductor current sensor comprises a current sense resistor in an input return path of the power factor correction circuit.

6. The power factor correction circuit of claim 1 wherein the threshold voltage is adjustable.

7. The power factor correction circuit of claim 1 wherein the power factor correction circuit is a boost converter.

8. An AC-DC power supply comprising: a rectifier that receives an AC input voltage and produces a rectified AC input voltage; a power factor correction stage that receives the rectified AC input voltage and produces an intermediate DC output voltage; and a DC-DC converter stage that receives the intermediate DC output voltage and produces a regulated output voltage for a load; wherein the power factor correction stage further comprises: an input that receives a rectified AC input voltage; at least one switching device operable to control an input current of the power factor correction stage to be in phase with the rectified AC input voltage; and control circuitry that controls the at least one switching device to produce a clipped sinusoidal input current, thereby increasing peak load capacity of the power factor correction circuit; wherein the control circuitry comprises:

control circuitry that generates a gate signal for the at least one switching device; an inductor current sensor; comparator circuitry that compares the sensed inductor current to a threshold voltage; and logic that selectively triggers the at least one switching device responsive to the gate signal and the comparator circuitry.

9. The AC-DC power supply of claim 8 wherein the control circuitry operates the at least one switching device in a critical conduction mode.

10. The AC-DC power supply of claim 8 further comprising an inductor having an inductor current therethrough controlled by the at least one switching device and the control circuitry, wherein the inductor is sized for a peak current corresponding to a peak of the clipped sinusoidal input current.

11. The AC-DC power supply of claim 8 wherein the inductor current sensor comprises a current sense resistor in series with the at least one switching device.

12. The AC-DC power supply of claim 8 wherein the inductor current sensor comprises a current sense resistor in an input return path of the power factor correction stage.

13. The AC-DC power supply of claim 8 wherein the threshold voltage is adjustable.

14. The AC-DC power supply of claim 8 wherein the power factor correction stage is a boost converter.

15. A power factor correction circuit comprising: an input that receives a rectified AC input voltage; an inductor having an inductor current therethrough; at least one switching device operable to control the inductor current to be in phase with the rectified AC input voltage; and control circuitry that controls the at least one switching device to produce a clipped sinusoidal inductor current, thereby increasing peak load capacity of the power factor correction circuit, wherein the inductor is sized for a peak current corresponding to a peak of the clipped sinusoidal input current; wherein the control circuitry comprises: critical conduction mode peak current control circuitry that generates a gate signal for the at least one switching device; an inductor current sensor; comparator circuitry that compares the sensed inductor current to a threshold voltage; and logic that selectively triggers the at least one switching device responsive to the gate signal and the comparator circuitry.

16. The power factor correction circuit of claim 15 wherein the threshold voltage is adjustable.

17. The power factor correction circuit of claim 15 wherein the power factor correction circuit is a boost converter.

* * * * *